United States Patent [19]

Pelly et al.

[11] 4,131,937
[45] Dec. 26, 1978

[54] NATURALLY COMMUTATED VOLTAGE-FED CONVERTER FOR LINKING A DC SOURCE TO AN AC SYSTEM

[75] Inventors: Brian R. Pelly, Lingfield, England; Peter Wood, Murrysville, Pa.

[73] Assignee: Electric Power Research Institute, Inc., Palo Alto, Calif.

[21] Appl. No.: 686,422

[22] Filed: May 14, 1976

[51] Int. Cl.² .................................... H02M 7/515
[52] U.S. Cl. .................................... 363/96; 363/136
[58] Field of Search .............. 321/9 R, 16, 27 MS, 321/45 R, 47; 323/102, 105, 123; 363/96, 135, 136, 160, 161, 162

[56] References Cited

U.S. PATENT DOCUMENTS

| 3,309,623 | 3/1967 | Depenbrock | 321/45 R |
| 3,475,674 | 10/1969 | Porterfield et al. | 321/45 R |
| 3,487,289 | 12/1969 | McMurray | 321/45 R |
| 3,694,732 | 9/1972 | Nollace | 321/45 R |

FOREIGN PATENT DOCUMENTS

| 261066 | 4/1968 | Austria | 321/45 R |
| 1563337 | 1/1970 | Fed. Rep. of Germany | 321/45 R |
| 2433825 | 1/1976 | Fed. Rep. of Germany | 323/102 |

Primary Examiner—William M. Shoop
Attorney, Agent, or Firm—Townsend and Townsend

[57] ABSTRACT

A naturally-commutated, voltage-fed direct-current (DC) to alternating-current (AC) power converter employing thyristor elements couples a DC power system with an AC power system without the requirement to force commutation. To effect natural commutation, the fundamental component of current flowing between the DC system and the AC system must lead the DC system switching voltage.

14 Claims, 38 Drawing Figures

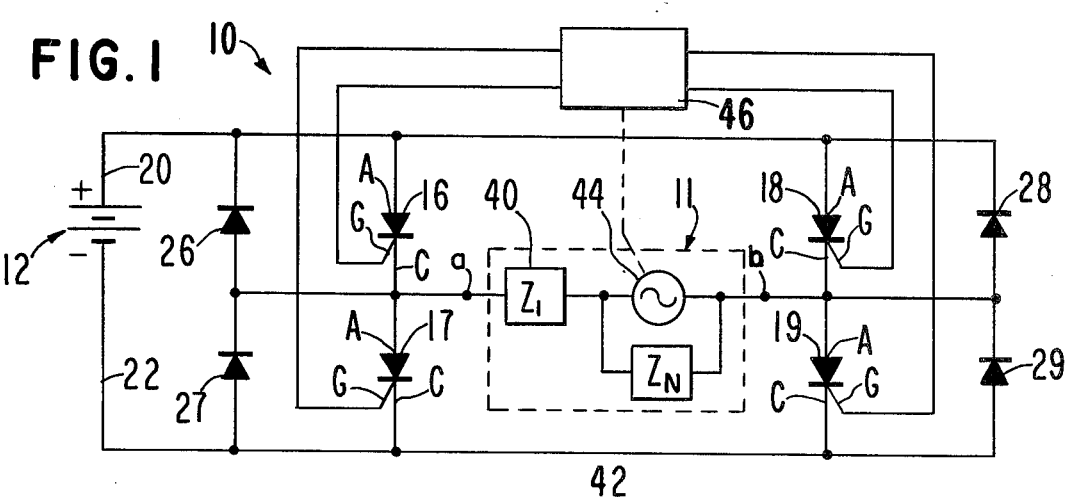
FIG. 1
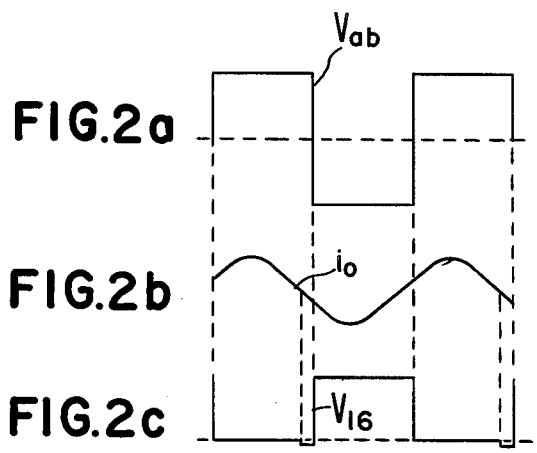
FIG. 2a
FIG. 2b
FIG. 2c
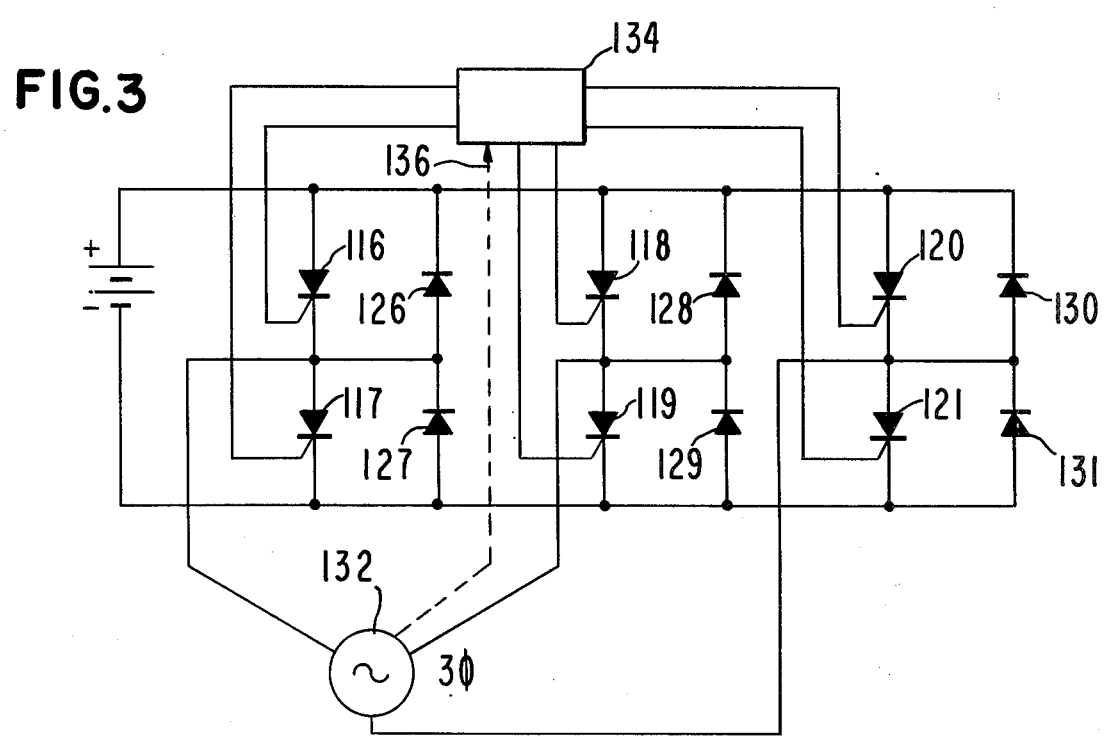
FIG. 3

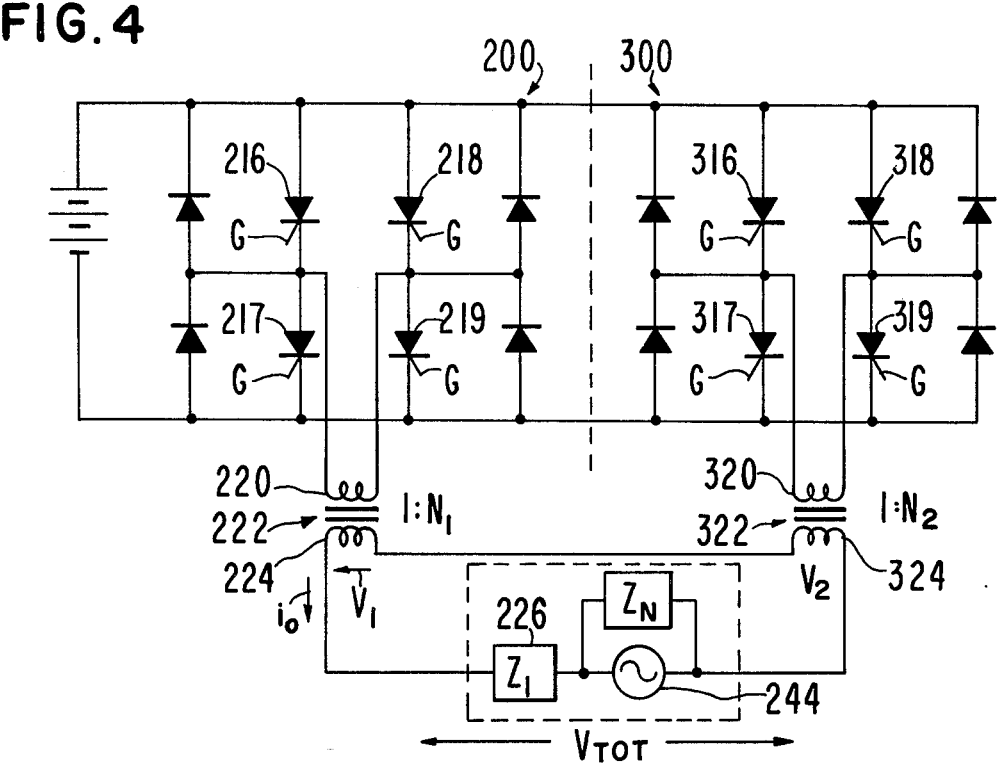
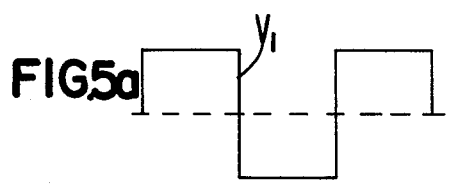
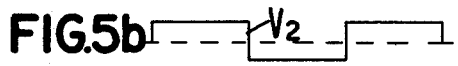
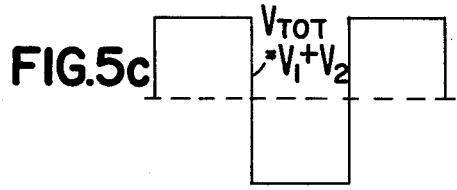
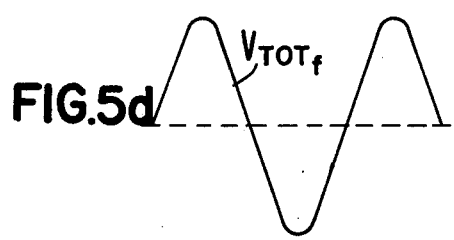
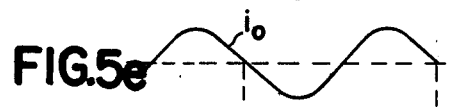
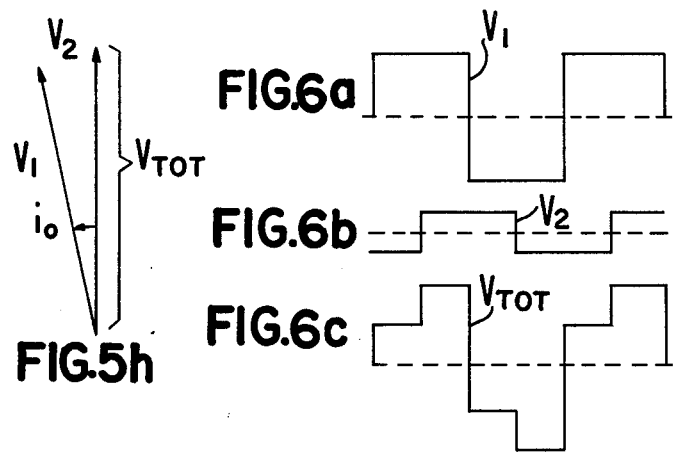
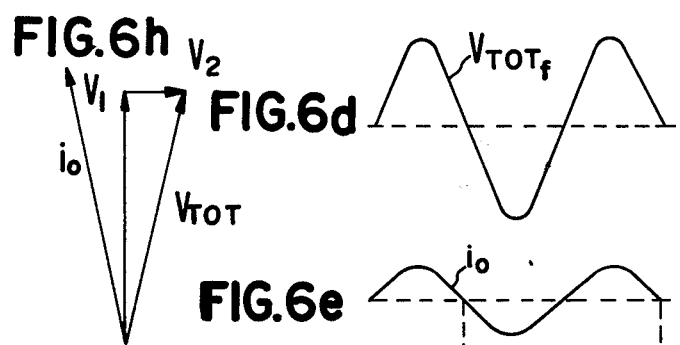

NATURALLY COMMUTATED VOLTAGE-FED CONVERTER FOR LINKING A DC SOURCE TO AN AC SYSTEM

BACKGROUND OF THE INVENTION

This invention was made under contract with or supported by the Electric Power Research Institute.

1. Field of the Invention

This invention relates to electric power conversion and particularly to a utility power system wherein a direct-current power source is coupled to an alternating current utility power network.

To meet increasing power demands placed upon electric utilities, it is necessary to couple electric power from a variety of sources into a compatible network for transmission and distribution. Many of the power sources, particularly those derived from emerging technologies such as fuel cells, batteries, magnetohydrodynamics and superconducting magnetic energy storage, provide or store electric power in the form of direct-current. Electric power thus provided must be interfaced with existing energy transmission and distribution networks with a minimum of power loss.

In addition, potential economic advantages exist for dispersed energy storage and generation techniques. For example, dispersed energy generation permits location of generation nearer the load centers, possible deferral of other expenditures for transmission and distribution equipment, and can increase the reliability of the bulk power supply system. Thus, it is considered desirable to provide self-contained energy conversion and storage power conversion units, in order to permit increased system flexibility.

In the development of energy conversion equipment great stress is laid on component reliability. Thus, DC/AC power conversion equipment must be highly reliable. Partly for this purpose attention is concentrated on the development of high power solid-state devices, such as thyristor or p-n-p-n type externally switchable rectifier circuitry, and the development of systems utilizing solid state devices. However, until relatively recently, solid-state devices with the potential power handling capability to perform power system related tasks have not been readily available.

2. Description of the Prior Art

Power conversion units based on voltage-fed forced commutation as the turn-off mechanism of a thyristor, or silicon controlled rectifier (SCR), are known for coupling DC and AC power systems. Voltage-fed force commutated converters of conventional design require auxiliary control and firing circuitry. In practice, over the broad power factor and voltage ranges contemplated, it is relatively difficult to achieve economical reliable, and efficient system operation with conventional voltage-fed converter configurations. Voltage-fed power converters must be capable of acceptable operating efficiency over a range of voltage levels. For example, battery-fed converters must operate over the useful voltage range of the batteries, which may be a ratio of peak-to-minimum voltage of 1.5 to 1.0.

Current-fed naturally-commutated energy conversion units are known for high voltage direct-current (HVDC) transmission applications.

So far as is known a naturally-commutated voltage-fed power converter has not been proposed.

SUMMARY OF THE INVENTION

A direct-current (DC) to alternating-current (AC) power converter employing thyristor elements couples a DC power system with an AC power system without the requirement to force commutation. The converter operates according to a principle of voltage-fed natural commutation, relying on the AC network current waves to provide the signals to effect cyclical turn-off of thyristor elements, wherein the fundamental component of current must lead the system switching voltage.

The converter comprises a thyristor bridge coupling with AC system terminals, diodes coupled antiparallel across each thyristor, and a thyristor firing system for maintaining the fundamental component of system current in an invariably leading relation relative of switched square wave commutating voltage provided at the AC system side of the thyristor bridge.

A converter according to the invention may operate as a DC to AC converter (inverter) or as an AC to DC converter (controlled rectifier) depending upon the relative phase of voltage and current components.

For controlling the relative phase of commutation under contemplated loading conditions the converter may comprise parallel buck-boost, naturally-commutated bridge networks inductively coupled into a common AC power system.

A converter according to this invention permits operation without auxiliary commutating circuitry under normal operating duty. Furthermore unlike a current-fed naturally-commutated converter, a voltage-fed converter in conjunction with a low-impedance DC voltage source is operative to suppress voltage transients generated in the AC system to which it is coupled which might impinge on the converter terminals. Thus, circuit elements having much lower voltage ratings may be employed in the converter circuits.

BRIEF DESCRIPTION OF THE DRAWINGS

The invention may be understood by reference to the following detailed description taken in conjunction with the drawings, in which:

FIG. 1 is a schematic diagram of a first preferred embodiment according to the invention;

FIGS. 2a–2c represent waveforms associated with the embodiment of FIG. 1;

FIG. 3 is a schematic diagram of a second preferred embodiment in a poly-phase system;

FIG. 4 is a schematic diagram of a third preferred embodiment illustrating a buck-boost circuit;

FIGS. 5a–5h are waveform and phase diagram associated with the embodiment of FIG. 4 in a maximum voltage inverter mode;

FIGS. 6a–6h are waveform and phase diagrams associated with the embodiment of FIG. 4 in an intermediate voltage inverter mode;

DETAILED DESCRIPTION OF PREFERRED EMBODIMENTS

Figure 7A:
FIGS. 7a–7n are waveform and phase diagrams associated with the embodiment of FIG. 4 in a minimum voltage inverter mode.

Various embodiments of voltage-fed power converters employing natural commutation, are described herein. In order to understand the underlying operating principles a brief explanation of a basic circuit embodying the invention is helpful.

FIG. 1 illustrates a circuit model showing a basic single-phase full-wave converter 10 coupling a load 11 and a DC source 12. The DC source 12 is coupled to a diode bridge comprising four thyristors 16, 17, 18, 19, which are coupled in two series pairs having the anode terminals A of thyristors 16 and 18 coupled in common to the positive voltage terminal 20 of the DC source, the cathode terminals C of thyristors 16 and 18 coupled to the separate anode terminals A of thyristors 17 and 19 respectively and the cathode terminals C of thyristors 17 and 19 coupled in common to the negative voltage terminal 22 of the DC source 12. Coupled across each thyristor 16-19 is a diode 26-29 coupled antiparallel, i.e., disposed in reverse polarity with respect to the corresponding thyristor 16-19.

The load 11 may comprise an AC network coupled between the anode terminals A of thyristors 16 and 18 at output terminals hereinafter designated a-b.

The AC network may be modeled for example as a series resonant tuned filter network having an inductive element 40 and capacitive element 42 coupled to a leading reactive element 44. The filter network is preferably tuned to the fundamental intended operating frequency of the AC network. In practice the reactive element 44 is an AC generator and the reactive elements of a generalized AC power distribution network.

A trigger network 46 is coupled to each of the gate terminals G of the thyristors 16-19. The trigger network 46 which may be of a known design is operative to synchronize the firing of the thyristors 16-19 in order to fire the thyristors 16-19 in selected order and phase, to cause the desired frequency output.

In order to achieve voltage-fed line (or natural) commutation to commutate current among thyristor elements 16-19, it is necessary that a low impedance connection to a solid system of AC voltages be made at the AC terminals a-b. To effect natural commutation, the fundamental component of current flowing between the AC system and the DC system must lead the system switching voltage. In other words, the converter must invariably draw a lagging quadrature current component from the system. By proper phase timing of the thyristors' 16-19 conduction periods with respect to the AC system phase to control the direction of current flow, the converter 10 may function as either a DC to AC converter (inverter) or as an AC to DC converter (controlled rectifier).

According to the invention, the trigger circuit 46 fires each of the thyristors 16-19 to produce a square wave of output voltage V$ab$ across terminals a and b, as depicted in FIG. 2a, at a fundamental frequency corresponding to the resonant frequency of the tuned filter network 40, 42 and which corresponds to the operating frequency of the AC network. The triggering voltage V$_{ab}$ is synchronized to produce a voltage waveform, lagging the current waveform $i_o$ (FIG. 2b) of the reactive element 44. For example, if the tuned network 40, 42, 44 were passive, a capacitive reactive load at steady state would require the current drawn from the DC source 12 to lead the triggering voltage of trigger network 46, since a resonant tuned filter network would restrict the frequency of the induced current primarily to the fundamental frequency. Referring to FIG. 2b, since the zero-current $i_o$ point leads the zero-voltage point of the output voltage square wave at the instant of commutation of each one of the triggered and conducting thyristors 16-19, a current is being returned to the DC source 12 through one of the respective return current diodes 26-29. Therefore, proper conditions exist for commutation by reverse bias of the triggered thyristors 16-19. By way of example, FIG. 2c depicts a waveform $v_{16}$ of the resultant voltage across the first thyristor 16 during the switching cycle illustrated by the waveform of FIG. 2a. The commutation occurs where the negative voltage is near the end of the first half of each cycle illustrated in FIG. 2c. During that brief interval, the current waveform in FIG. 2b is of opposite polarity relative of the trigger voltage depicted in FIG. 2a.

The above-described converter utilizing natural-commutation is readily operable in a large-scale power grid where the AC network includes a sinusoidal alternating current power source. In a single-phase system, a series resonant filter network such as filter network 40, 42, in FIG. 1 may be required, since the square-wave output voltage of a single-phase converter is relatively rich in harmonic components. Absent a filter network or its equivalent, a distorted output current waveform may be generated, which produces multiple zero-crossings. Controlled natural-commutation is difficult to attain under such conditions.

FIG. 3 depicts a generalized embodiment of the invention comprising three phase converter having a three-segment bridge of thyristors 116-121 and diodes 126-131 coupled to a three phase AC system 132. A trigger circuit 134 is operative to sense the AC network phase as indicated by a control coupling 136 and to fire the thyristors 116-121 according to a desired sequence and phase angle. In practical three-phase high voltage power systems a filter network is generally not required to attain controlled natural-commutation. By means of well-known techniques of harmonic neutralization a voltage output waveform of suitable quality for the purposes of commutation may be attained. Therefore, for the purposes of explanation and simplification, the waveform of the output current flow shall hereinafter be presumed to be substantially sinusoidal, notwithstanding the absence of a tuned filter network. However, as is hereinafter explained, some reactive coupling may be necessary and even desirable in practical applications.

The embodiments of the converter described heretofore are basically functional and operative according to the inventive concept so long as the amplitude of the fundamental component of the converter output voltage is compatible with the amplitude of the voltage of the AC power network to which it is coupled. However, in practical applications it may be desirable to control the amplitude of the converter output current and to regulate the current against contemplated variations in the DC source voltage and against the variations in the AC system voltage and phase under various loading conditions.

Basically, DC to AC converter output current may be controlled by regulation of the amplitude and phase of the converter output voltage. Phase control is readily maintained by suitable control of the relative sequence and timing of the triggering network of the thyristors. The amplitude of the output voltage is, on the other hand, a direct function of the DC source voltage level. One technique for controlling output amplitude is to vary the DC voltage level. In many applications this may be undesirable or impractical. Conduction angle control, as provided in a force-commutated converter, is impractical in a naturally-commutated converter since the resultant conduction angle control may violate the conditions necessary to natural commutation.

An alternative technique for output-current amplitude control is to provide a complementary output voltage of a secondary converter coupled in series with the output of a primary converter. According to this technique, the direction of power flow and the magnitude of the real current component are controlled by adjustment of the relative phasing of primary and secondary converters and of the source voltage.

A circuit for a single-phase system illustrating the technique of complementary, or buck-boost, output-voltage control is depicted schematically in FIG. 4. In a primary converter 200 thyristors 216–219 are coupled to a primary winding 220 of a first transformer 222 having a turns ratio of 1 to $N_1$. In a secondary converter 300 thyristors 316–319 are coupled to a primary winding 320 of a second transformer 322 having a turns ratio of 1 to $N_2$. The secondary windings 224 and 324 of the first transformer 222 and second transformer 322 may be coupled in series. The voltage across secondary winding 224 is designated $v_1$, and the voltage across the secondary winding 324 is designated $v_2$. The maximum secondary converter voltage $v_2$ is generally less than the maximum primary converter voltage $v_1$, although the maximum voltages $v_1$ and $v_2$ need not be substantially different. The ratio of intended maximum voltages $v_1$, $v_2$ is selected on the basis of the desired range of total output voltage control. The output voltage $v_{TOT}$ may be viewed as the vector sum $\vec{v}_1 + \vec{v}_2$. For the purposes of illustration, in FIGS. 5a–5h, 6a–6h, 7a–7h, and 8a–8h the maximum absolute value of $v_2$ shall be assumed to be approximately 25% of the maximum absolute value of $v_1$.

Suitable trigger logic (not shown) may be coupled to the gate terminals G of each thyristor to provide the proper relative timing of thyristor firing. In general the trigger logic is operative to fire the thyristors 216–219 of the primary converter 210 at a phase angle fixed relative to the AC network current wave. Preferably the thyristors 216–219 may be fired at a relative phase angle just sufficient to allow the thyristors 216–219 to commutate naturally. The primary converter 200 firing timing may be delayed only slightly in phase relative to the AC network because natural commutation may take place immediately upon the zero-crossing of the current wave.

It will be recognized that the required trigger control for a voltage-fed converter is essentially the dual of that required for a current-fed inverter. Thus, similar control means may be used. For example, a voltage-fed inverter is controlled by sensing the current flowing between the inverter and the AC system and firing the thyristors in timed relation to the phase of the sensed current. Sensing may be accomplished by separating the real component (that which is in phase with the AC system voltage) of the current from its imaginary component (that which is quadrature phase relationship with the AC system voltage).

The real and imaginary components may be separated by any of the well known techniques for so doing. For example, sampling the current at the zero-crossings of the AC system voltage yields the peak value of the imaginary component, while sampling the current at the peak value of the AC system voltage yields the peak value of the real component.

Exemplary triggering circuits which may be used in the system are disclosed in Pelly, *Thyristor Phase Controlled Converters and Cycloconverters*, Wiley Interscience, 1971, page 247 and page 255, wherein phase locked loop controls are described, and page 229, and page 249, wherein cosine crossing controls are described.

It will be noted that these controls utilize the AC current rather than the AC voltage for timing information. Furthermore in the specific embodiment of FIG. 4, these controls would produce triggering pulses for the primary converter 200 (which is operated at a fixed angle) in sufficient delay of the AC current zero-crossings to permit those thyristors just extinguished to recover for retriggering while also providing sufficient further delay in the triggering of the thyristors of the auxiliary converter 300 to produce the desired magnitude or peak value of the real current component.

As a precaution against undesired delay in commutation, it may be necessary in practical systems to time-out, just before each thyristor is about to be commutated, the firing of certain types of thyristors which may be used in the circuit. In this manner the thyristors, particularly such types as might have relatively slow characteristic recovery time, are provided with sufficient time to guarantee commutation. In inverter mode operation it is generally preferred that the thyristors be of the type generally designated for inverter service. In particular, such thyristors, should possess guaranteed switch characteristics and be of relatively high switching speeds.

The selection of the primary converter firing phase with respect to AC system phase is typically a delicate control task. In practical systems it is found desirable to couple the converter through a substantial reactance 226. A reactance value as much as about 10% of the total impedance based on the rated voltage and current is generally sufficient. (It should be noted that the total system impedance is intended to be relatively low.) An appreciable relative reactance value is helpful in establishing a relatively distortion-free current waveform and in desensitizing the control of the firing phase of the converter with respect to the AC system phase. A supplementary reactance also limits spurious fault currents which may interfere with accurate commutation.

Referring to FIG. 5a, there is shown the voltage waveform of the primary converter voltage $v_1$. (It is assumed that the triggering sequence is phased synchronized with the phase of the AC network.) FIG. 5b illustrates the voltage waveform of the secondary converter voltage $v_2$ in phase with voltage $v_1$. FIG. 5c illustrates the waveform of the total voltage $v_{TOT}$, which is the instantaneous sum of $v_1$ and $v_2$ when $v_2$ is substantially in phase with $v_1$. FIG. 5d illustrates the filtered total output voltage $v_{TOTf}$ as provided to the AC power network 244 under these phase conditions. FIG. 5e illustrates the output current waveform $i_o$, which must lead the voltage waveform in order to effect commutation. FIG. 5f illustrates the waveform of the voltage across thyristor 216 of the primary converter 200. FIG. 5g illustrates the waveform of the voltage across thyristor 316 of the secondary converter 300. During the commutation portion of the cycle C, the thyristor is reverse biased, blocking current flow in the selected thyristor, and effecting commutation to the next thyristor desired to conduct. FIG. 5h is a vector diagram showing the relative phase of $v_1$, $v_2$, $v_{TOT}$ and $i_o$, where $v_1$ and $v_2$ are substantially in phase.

FIGS. 6a through 6h illustrate voltage amplitude and relative phase control for intermediate voltage ranges. In an intermediate voltage range, the voltage of the secondary converter 300 is caused to lag the voltage of the primary converter 200. The amount of phase lag determines the maximum amplitude of the filtered or average output voltage $v_{TOTf}$. Attention must be paid to the phase of the output current $i_o$ to assure that the current $i_o$ leads the voltage $v_1$ and $v_2$ of both the primary and secondary converters 200 and 300 sufficiently to effect the desired natural-commutation of both the primary converter 200 and the secondary converter 300.

FIG. 6a illustrates the voltage waveform of the primary converter voltage $v_1$. FIG. 6b illustrates the voltage waveform of the secondary converter voltage $v_2$ lagging in phase relative to the voltage $v_1$ by approximately 90°. FIG. 6c illustrates the waveform of the total voltage $v_{TOT}$, which is the instantaneous sum of $v_1$ and $v_2$. FIG. 6d illustrates the filtered or average total output voltage $v_{TOTf}$ as provided to the AC power network 244. FIG. 6e illustrates the output current waveform $i_o$ of the combined primary and secondary converter output, under these phase conditions. FIG. 6f illustrates the waveform of the voltage across thyristor 219 under these phase conditions. Similarly, FIG. 6g illustrates the waveform of the voltage across thyristor 319 of the secondary converter 300 under these phase conditions. The current $i_o$ (FIG. 6e) leads the phase of the voltage of both the primary converter 200 and the secondary converter 300 a sufficient amount to induce natural commutation in both converters. FIG. 6h is a vector diagram illustrating the relative phase of $v_1$, $v_2$, $v_{TOT}$, and $i_o$, where the phase of $v_1$ and $v_2$ differ by approximately 90°.

Where $v_1$ leads $v_2$ by between approximately 90° and 180°, the average or filtered voltage $v_{TOTf}$ will be substantially less than the arithmetic maximum voltage $v_{TOT}$. For example, where $v_1$ leads $v_2$ by 150°, the average voltage $v_{TOTf}$ will be approximately 65% of the maximum voltage $v_{TOT}$. FIGS. 7a through 7h illustrate operation in this so-called minimum voltage mode.

Figure 7B:
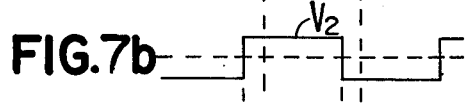
Figure 7C:
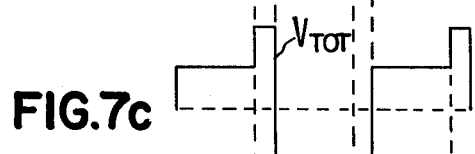
Figure 7D:
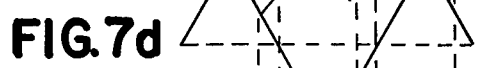
Figure 7E:
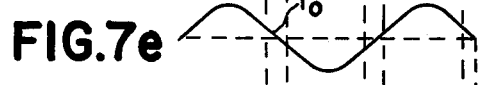
Figure 7F:
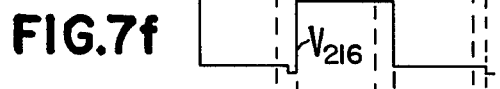
Figure 7G:
Figure 7H:
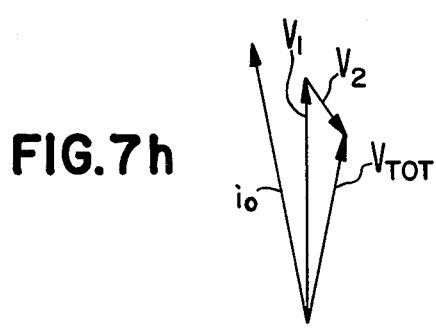

FIG. 7a depicts the voltage waveform of the primary converter voltage $v_1$. FIG. 7b illustrates the voltage waveform of the secondary converter voltage $v_2$, delayed with respect to the phase of voltage $v_1$ by approximately 150°. FIG. 7c illustrates the waveform of the total voltage $v_{TOT}$, which is the instantaneous sum of $v_1$ and $v_2$. FIG. 7d illustrates the filtered total or average output voltage $v_{TOTf}$ of the combined primary and secondary converter 200 and 300 as provided to the AC power network 244. FIG. 7e illustrates the output current waveform $i_o$ under these phase conditions when the primary and secondary converter 200 and 300 are operating in the naturally-commutated mode. FIG. 7f illustrates the waveform of the voltage across thyristor 219 under these phase conditions. Similarly FIG. 7g illustrates the waveform of the voltage across thyristor 319 under these phase conditions. FIG. 7h is a vector diagram showing the relative phase of $v_1$, $v_2$, $v_{TOT}$, and $i_o$, when $v_1$ and $v_2$ differ in phase by approximately 150°. As should be apparent from FIGS. 5, 6, and 7 the voltage $v_{TOTf}$ approaches theoretical minimum as the voltage phase difference approaches 180°.

In practical power network operation, provision must be made for control under time-varying load conditions and DC voltage levels, if a constant power factor of the power system is to be maintained. In a real system using non-ideal components, the power converter itself requires a lagging component of current from the connected system. In addition, the extrinsic reactance described hereinabove also requires a lagging component of current from the connected system. These load components impose practical limitations on the range of current control achievable under varying load conditions while maintaining constant power factor. In particular, it may be difficult to achieve the in-phase naturally-commutated operation illustrated in FIGS. 5a through 5h. This limitation is imposed by the absolute amplitude of the distortion components of current, which remain relatively fixed regardless of load. Thus, at low levels of fundamental current, the relative distortion of the current waveform will be high, giving rise to difficulties in maintaining natural-commutation.

In order to overcome this potential phase control limitation, the primary and secondary converters 200 and 300 (FIG. 4) may be operated in a manner compensating for the excess or surplus leading current of power factor correction capacitors, that is, operated to effectively reduce or "spoil" fixed capacitive reactance typically provided in an AC power system, during periods of decreasing and minimal load. Thus, where the power system is operative without external load, an appreciable current would still be permitted to flow through the converters 200 and 300, supplying leading current and thereby maintaining the thyristors in proper naturally-commutated operation. It should be noted however, that in general total spoiling is not desirable.

The voltage range control feature provided by a buck-boost converter permits interface with both a variable range load and a variable range source. The transformer ratios of the primary converter and the secondary converter determines the range of voltage adjustment. For the purposes of illustration, it has been assumed that the primary converter 200 accounted for 75% of the maximum output voltage and the secondary converter 300 accounted for 25% of the maximum output voltage. Practical considerations may dictate that the primary converter 200 and secondary converter 300 be equally rated. For example, this would permit the use of a standard self-contained converter unit and a standard transformer unit. Furthermore, this would permit the attainment of a wider range of minimum average output voltage.

Heretofore the invention has been described as it may be embodied in a DC to AC converter or inverter. The invention may also be useful as a naturally-commutated AC to DC converter or controlled rectifier. In an embodiment as a controlled rectifier the circuit configuration is substantially identical to the previously described circuit configuration. The principal difference is found in the firing of the trigger circuitry directing power flow.

Figure 8A:
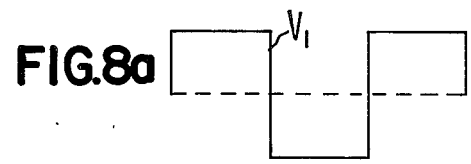
FIGS. 8a–8h are waveform and phase diagrams associated with the embodiment of FIG. 4 in a maximum voltage controlled rectifier mode.
Figure 8B:

FIG. 8a through 8h show waveforms and phase diagrams of the circuit of FIG. 4 operating in the rectifying mode. The circuit is operating as a controlled rectifier. FIG. 8a depicts the voltage $v_1$ waveform of the primary converter 200. FIG. 8b depicts the voltage $v_2$ waveform of the secondary converter 300. The phase of voltage $v_2$ phase difference to a theoretical maximum lead angle of 180° less the current $i_o$ lead angle necessary for natural commutation.

It is to be observed, that in practical application, the lead angle of voltage $v_2$ over voltage $v_1$ may be limited for example, to approximately 150°, due at least in part to thyristor recovery time constants and irregularities in the current $i_o$ waveform.

Figure 8C:
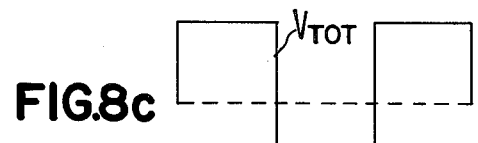
Figure 8D:
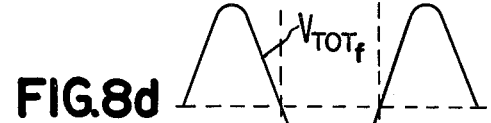
Figure 8E:
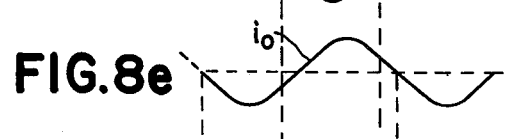

FIG. 8c represents the instaneous maximum voltage $v_{TOT}$ in FIG. 8d represents the filtered voltage $v_{TOTf}$. FIG. 8e depicts the current $i_o$ waveform across terminals a and b in the rectifying mode. It should be noted that the current $i_o$ leads the voltage $v_1$ by almost 180°, as a result of thyristor firing timing synchronized to the current $i_o$ waveform.

Figure 8F:
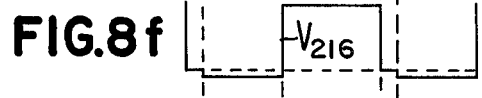
Figure 8G:
Figure 8H:
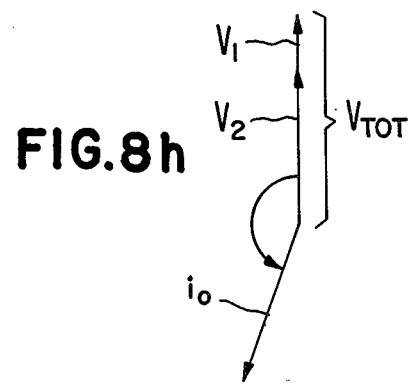

FIG. 8f depicts the voltage across thyristor 216 and FIG. 8g depicts the voltage across thyristor 316 for corresponding intervals. FIG. 8h is a phase diagram for this operating mode showing $i_o$ substantially leading $v_{TOT}$. It should be apparent from these illustrative waveform representations that substantially analogous phase shift power control may be achieved in the rectifier mode as in inverter mode.

The converter according to the invention herein described provides an element of a power system which is compatible with many direct current energy storage and conversion concepts under development. The converter operative in the inverter mode may be utilized with an appropriate control system to provide a relatively inexpensive and efficient electric interface between individual DC power sources and AC power networks presently in service.

The converter further provides a power conversion device which may be wholly self-contained and disposed to economical standardization. In particular, a unit incorporating the invention need not be encumbered with additional controls and auxiliaries required of force-commutated converters. In addition, standardization of units permits ready interchanges in the event service is required.

A voltage-fed naturally commutated converter is also compatible with operation of a power system having relatively low impedance, which is advantageous in many applications. Moreover, specific embodiments of the invention permit efficient power conversion over a wide range of operating voltages.

The invention has been described with reference to selected embodiments. Various modifications may be utilized by those of ordinary skill in the art in light of the present disclosure without departing from the inventive concept. Therefore, it is not intended that the invention be limited except as circumscribed by the appended claims.

What is claimed is:

1. A naturally-commutated voltage-fed converter interfacing a relatively low impedance alternating-current (AC) system having first and second complementary terminals and a direct-current (DC) system having first and second complementary terminals for effecting power conversion comprising:
   (a) a thyristor bridge means including a first thyristor means coupling said first DC system terminal to said first AC system terminal;
   a second thyristor means coupling said second DC system terminal to said second AC system terminal;
   a third thyristor means coupling said first DC system terminal to said second AC system terminal;
   a fourth thyristor means coupling said second DC system terminal to said first AC system terminal;
   diodemeans coupled antiparallel across each said thyristor means; and
   (b) means operative to cyclically trigger said thyristor means, including means to sense the current phase in said AC system, for inducing a commutating voltage at said AC system terminals, wherein the fundamental component of current between said DC system and said AC system invariably leads said commutating voltage, providing a reverse current for effecting commutation of each said thyristor means.

2. A naturally-commutated converter according to claim 1, further including means for suppressing current harmonics.

3. A naturally-commutated converter according to claim 1, further comprising:
   a secondary thyristor bridge means coupled in parallel to said DC system and in series to said AC system.

4. Apparatus for coupling electric power between a direct current (DC) voltage source and an active alternating current (AC) electric power system to effect voltage-fed natural commutation comprising the combination of:
   means including bridge-coupled thyristors connecting said voltage source across said power system for providing a switch-controlled path for electric current therebetween; and
   means sensing the current phase on said AC system to synchronously trigger said thyristors establishing switched DC voltage of said source having a fundamental frequency at the fundamental frequency of said AC system and maintaining said switched DC voltage in an invariably lagging phase relation relative to the phase of the current of said AC system for producing a timely reverse current to effect natural commutation of said thyristors.

5. Apparatus according to claim 4, wherein said thyristor bridge means further includes a plurality of diodes coupled antiparallel across each thyristor, defining at least one thyristor and diode bridge.

6. Apparatus according to claim 5, further including means for supressing current harmonics.

7. Apparatus according to claim 6, wherein said harmonic supressing means includes a band pass filter network tuned to the fundamental frequency of said AC system.

8. Apparatus according to claim 5, wherein said thyristor bridge means comprises a primary thyristor and diode bridge and a secondary thyristor and diode bridge, said secondary thyristor and diode bridge being coupled in parallel to said DC source and in series to said AC system in a voltage buck-boost relation.

9. Apparatus according to claim 8 wherein said primary thyristor and diode bridge and said secondary thyristor and diode bridge are inductively coupled in said voltage buck-boost relation with said AC system.

10. Apparatus according to claim 9, further comprising means for varying the phase of said voltage triggering of said primary thyristor and diode bridge relative to the phase of triggering of said secondary thyristor and diode bridge for varying the composite magnitude of said switched DC voltage.

11. A naturally-commutated converter according to claim 2, wherein said harmonic suppressing means includes a band pass filter network tuned to the fundamental frequency of said AC system.

12. A method of providing voltage-fed power from a DC voltage source to an active AC power system through a DC to AC thyristor converter, whereby commutation of said converter is effected naturally, said method comprising the steps of:

coupling said converter from said DC voltage source across said AC system sensing the current phase of said power system;

sequentially triggering switching thyristors of said converter to produce switched DC voltage at the fundamental frequency of said AC system and at a phase invariably lagging the phase of the current of said AC system, such that a timely reverse current is produced to effect naturally commutation of said switching thyristors.

13. A method according to claim 12, further including the steps of controlling AC current flow between said voltage source and said AC system, said steps comprising:

regulating the magnitude of the switched DC voltage in quadrature phase with the voltage of said AC system for controlling the real component of current flow between said DC source and said AC system;

regulating the magnitude of the switched DC voltage in-phase with the voltage of said AC system for controlling the quadrature phase component of current flow between said DC source and said AC system.

14. A method according to claim 12, wherein phase information is derived from the phase of said AC current and wherein said phase information initiates said triggering sufficiently in delay of zero crossings of said AC current to provide adequate recovery time for previously commutated thyristors of said converter.

* * * * *